United States Patent [19]

Prüss

[11] Patent Number: 4,962,835
[45] Date of Patent: Oct. 16, 1990

[54] SYSTEM FOR PREVENTING UNDESIRED VEHICLE ACCELERATION

[75] Inventor: Ludwig Prüss, Braunschweig, Fed. Rep. of Germany

[73] Assignee: Volkswagen AG, Wolfsburg, Fed. Rep. of Germany

[21] Appl. No.: 354,489

[22] Filed: May 19, 1989

[30] Foreign Application Priority Data

May 19, 1988 [DE] Fed. Rep. of Germany ....... 3817097

[51] Int. Cl.$^5$ ............................................. B60K 41/28
[52] U.S. Cl. ..................................... 192/0.03; 74/859; 192/0.08; 192/1.21
[58] Field of Search .................... 192/0.07, 0.03, 0.09, 192/0.094, 1.21, 0.08; 74/872, 859

[56] References Cited

U.S. PATENT DOCUMENTS

| | | | |
|---|---|---|---|
| 3,645,366 | 2/1972 | Numazawa et al. | 74/872 X |
| 3,756,358 | 9/1973 | Espenschied et al. | 192/0.09 |
| 4,200,007 | 4/1980 | Espenschied et al. | 74/859 |
| 4,819,163 | 4/1989 | Shimizu et al. | 74/872 X |

FOREIGN PATENT DOCUMENTS 3021489 12/1981 Fed. Rep. of Germany .

Primary Examiner—Rodney H. Bonck
Attorney, Agent, or Firm—Brumbaugh, Graves, Donohue & Raymond

[57] ABSTRACT

In the embodiment described in the specification, a vehicle has a drive train that can be disengaged which extends from an engine through a transmission to the vehicle drive wheels. The engine has a device for increasing the engine speed which can be activated by the operator actuation of the accelerator or automatically by signals from a control unit. To prevent undesired increases in engine speed an arrangement is provided to automatically disable any increase is speed of the drive train when the accelerator is not activated, if the drive train has not been disengaged after passage of a predetermined period of time.

14 Claims, 2 Drawing Sheets

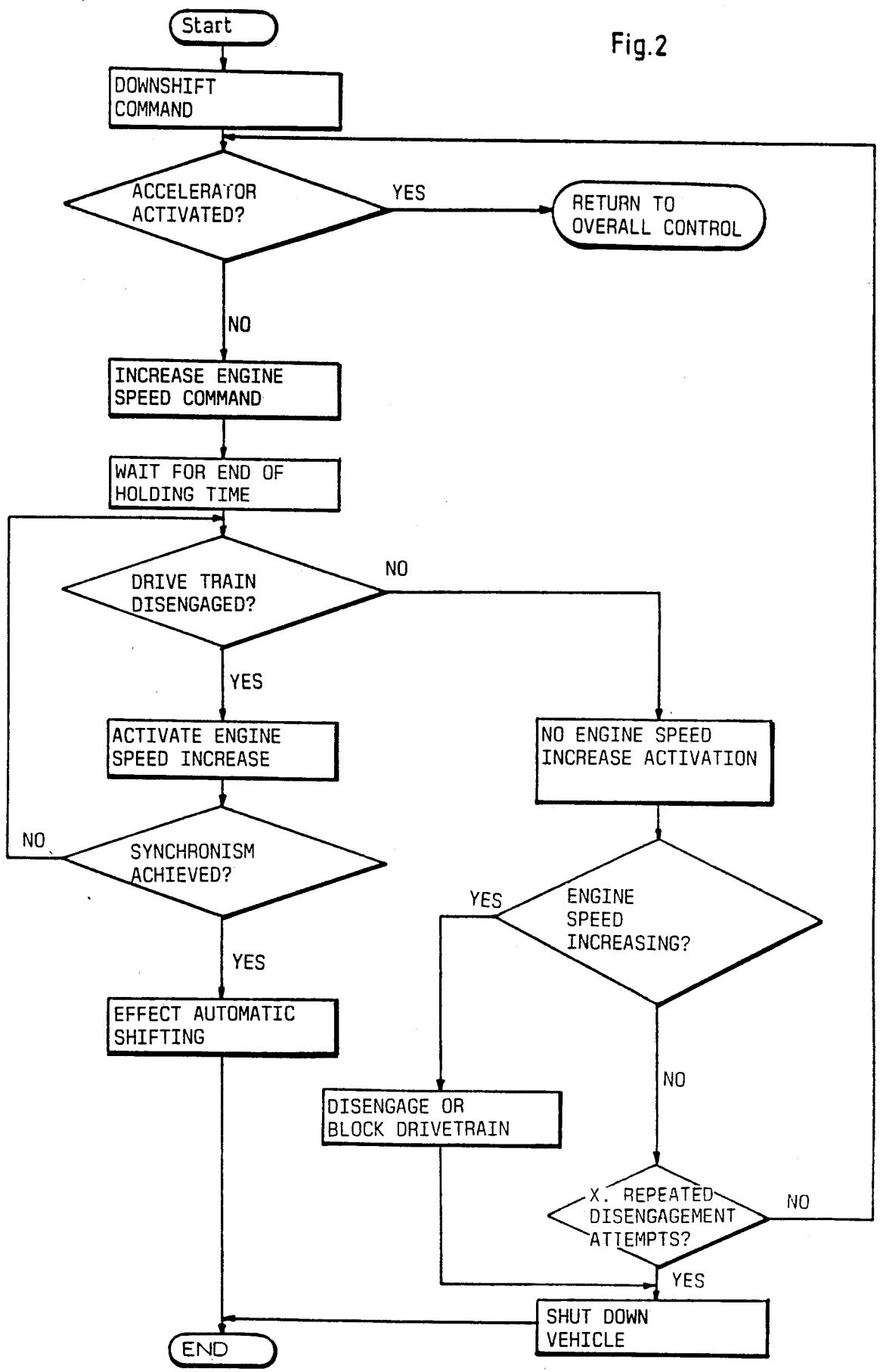

SYSTEM FOR PREVENTING UNDESIRED VEHICLE ACCELERATION

BACKGROUND OF THE INVENTION

This invention relates to methods and apparatus for preventing undesired acceleration of a vehicle having an automatic engine speed control device.

German Offenlegungsschrift No. 30 21 489 discloses a conventional vehicle having a device for the synchronized shifting of a multiple speed transmission in which the shifting synchronization elements are not speed coordinated to the individual transmission operations. The synchronization of the transmission elements to be engaged is achieved by selective retarding or acceleration of the transmission drive shafts, under the influence of a control mechanism. In one embodiment of the invention disclosed in Offenlegungsschrift No. 30 21 489 the device that accelerates the transmission drive shaft is the vehicle engine For this purpose a device for increasing the engine speed which can be activated by the control mechanism is coordinated with the engine.

Arrangements of this type can cause a safety problem if erroneous operation of the device causes an increase in engine speed which is required for synchronization while the engine is coupled to the drive wheels of the vehicle, or if, because of erroneous operation of the coupling device between the engine and the drive wheels, the device for increasing engine speed is actuated while they are coupled. Such operation can result in acceleration of the vehicle that would startle the driver, and thus can considerably affect the safety operation of the vehicle.

SUMMARY OF THE INVENTION

Accordingly, it is an object of the invention to provide a vehicle control system which overcomes the abovementioned disadvantages of the prior art.

Another object of the invention is to provide a method and apparatus for preventing undesired acceleration of a vehicle.

These and other objects of the invention are attained by providing a control system for a vehicle which terminates operation of a device for increasing engine speed automatically if the vehicle accelerator is not actuated and the engine is not disconnected from the drive wheels after a predetermined time period. The automatic activation of the device for increasing engine speed for the purpose of synchronization is therefore terminated. In addition, however, erroneous signals from the control device, as well as irregularities in components of the engine speed increase device, caused by wear or dirt, can also lead to an independent activation of the engine speed increase device. In this case, through an additional procedure according to the invention, an independent disengagement and/or blocking of the drive train is effected to prevent an increase in vehicle speed. Increased vehicle speed caused by the independent activation of the engine speed increase device can also be prevented, as a supplementary or individual measure, in the case of a control device that is operating properly, if, for example, the ignition or fuel injection moment in a reciprocating-piston internal combustion engine, is shifted far behind the top dead center of the cylinder(s) in such manner that the engine provides little power.

For safe execution of the method according to the invention, the invention provides embodiments of devices that detect a disengagement of the drive train, recognize an erroneous control of the engine speed increase device, and facilitate disengagement and/or blocking of the drive train.

Disengagement of the drive train can be detected by various devices. In one embodiment according to the invention, position sensors are provided for the transmission components to indicate to the control device the positions of the drive elements that are to be coupled with each another. These position sensors can be, for example, circuit elements that are activated by disengaged gear stages, and which signal the resulting disengagement of the drive train to the control device.

Another device has rotation sensors coordinated with the drive train which send their signals to an evaluation unit. This evaluation unit sends a signal to the control device indicating disengagement of the drive train if the acceleration of the engine caused by the engine speed increase device is larger than the maximum acceleration achievable by the engine when the vehicle accelerates. The rate of the engine speed increase is evaluated by an evaluation unit of this type.

Disengagement of the drive train can also be indicated according to the invention by a device that compares the actual vehicle acceleration with a predetermined maximum figure by means of rotation and/or acceleration sensors and also by means of an evaluation unit connected with those sensors. Disengagement of the drive train is indicated to the control device by the evaluation unit if the pre-determined maximum value is exceeded. The determination of such a maximum figure can be based, for example, on an acceleration that occurs when the vehicle is traveling down a hill having a specific slope.

Each of the devices hereinabove described is, considered separately, suitable for indicating the disengagement of the drive train. However, to further reduce the risk to safety from undesired acceleration, as many devices as desired can be provided. The more devices there are, the smaller the risk.

Any erroneous control of the engine speed increasing device is detected by a device that monitors the engine speed increasing device by means of a position sensor and a function sensor The signals from these sensors are sent to the control device, where they are checked for plausibility. The function sensor ensures that the actual position of the engine speed increasing device is not contradictory to the position reported by the position sensor. A vehicle acceleration caused by erroneous control and determined by this method can be inhibited if activation of the engine speed increasing device is terminated, and/or the drive power is automatically shut off.

In an undesired vehicle acceleration, the drive power can be shut off if the drive train is interrupted and/or blocked, by other devices according to the invention. For example, interruptions in the drive train may be accomplished by activating devices which disengage coupled drive elements. In such devices, for example, activation of the drive elements by high hydraulic pressure is conceivable, in such manner that the drive elements are disengaged and the drive train is thereby interrupted. Another way of disconnecting the drive train may be provided by a coupling unit positioned between the engine and the transmission. In the event of an undesired vehicle acceleration, caused by erroneous control, the control device may, for example, cause the coupling unit to be disengaged, so that no transmission of drive power is possible.

Independent blocking of the drive train can also be ensured, according to the invention, by a brake device that operates on the engine directly. Another method for the independent blocking of the drive train involves activation of the vehicle braking equipment.

The above-described devices for neutralizing undesired vehicle acceleration can be combined as desired. The principle that the more methods are combined the greater the reduction in risk is applicable here.

Which, and how many, embodiments of the method for preventing undesired accelerations are ultimately used in a vehicle is a question of individual need for safety. The variants described herein show that for an ordinary vehicle a suitable measure of security against undesired accelerations can be provided.

BRIEF DESCRIPTION OF THE DRAWINGS

Further objects and advantages of the invention will be apparent from a reading of the following description in conjunction with the accompanying drawings, in which:

FIG. 2 is a schematic flow diagram showing the operation of a typical system in accordance with the invention.

DESCRIPTION OF THE PREFERRED EMBODIMENTS

Figure 1:
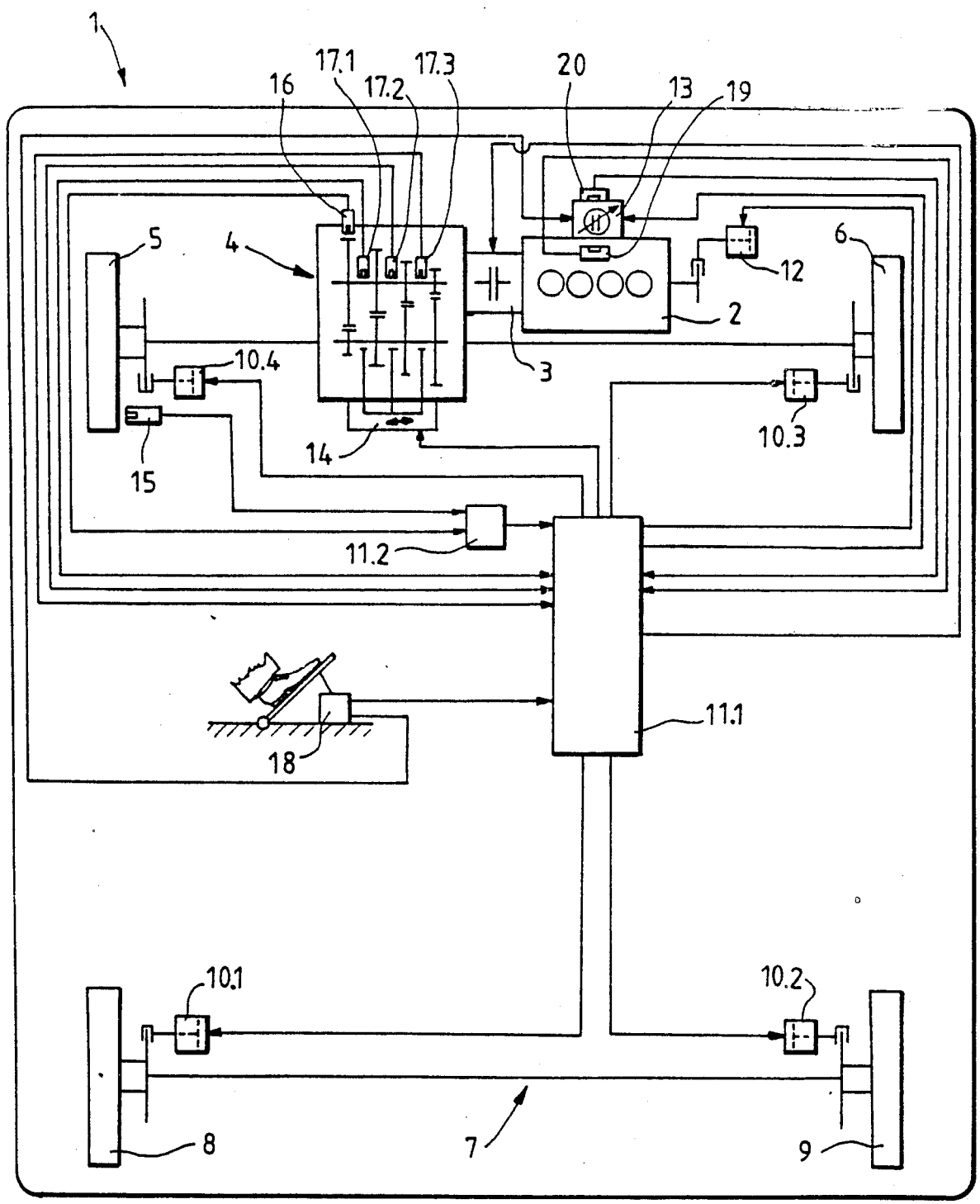
FIG. 1 is a schematic illustration of a typical vehicle provided with a system for preventing undesired acceleration in accordance with the invention.

In the representative embodiment of the invention shown schematically in FIG. 1, a vehicle 1 of the usual type has a drive train formed essentially of an engine 2, a drive train coupling unit 3, a transmission 4, and two front drive wheels 5 and 6.

Two rear wheels 8 and 9 are positioned on an axle 7 and all of the wheels 5, 6, 8 and 9 of the vehicle can be restrained by corresponding brake devices 10.1–10.4 in response to control signals from a control device 11.1. In addition, the control device 11.1 can transmit control signals through corresponding signal lines to an engine brake device 12, an engine speed increase device 13, the coupling unit 3, and a transmission activation device 14. The information necessary for controlled operation of these devices is received by the control device 11.1 from an evaluation unit 11.2, which receives signals from a wheel speed sensor 15 and a transmission speed sensor 16, as well as from three gear position sensors 17.1–17.3 on the transmission 4 and an accelerator 18 which is also directly connected with the engine speed increase device 13. In addition, the control device 11.1 can respond to signals from a function sensor 19 and a position sensor 20, which are coordinated with the engine speed increase device 13.

The detected position of the accelerator 18 indicates to the control device 11.1 whether vehicle acceleration is or is not desired by the vehicle operator. An independent initiation of the engine speed increase device 13 by the control device 11.1 for the synchronous engagement of transmission elements, when the accelerator 18 has not been actuated, is interrupted according to the invention when appropriate detectors show no disengagement of the drive train after a predetermined length of time has passed. For this purpose, for example, the gear position sensors 17.1–17.3 provided in the transmission 4 must indicate the disengaged position of all gear stages to the control device 11.1 before the automatic increase in engine speed is permitted.

Another possibility for detecting drive train interruption is provided by the evaluation unit 11.2, which is connected with the transmission speed sensor 16. The sensor 16 detects the speed changes effectuated by the engine speed increase device 13 which are then transmitted to the evaluation unit. When the drive train is disconnected, the rate of acceleration of the engine 2 is considerably greater than when the drive train is connected, because the engine 2 can then operate at a high speed almost load-free. The location of the sensor 16 is not limited to the position between the drive train and the engine 2 illustrated in the drawing. A sensor that works in similar manner can also be positioned, for example, on the coupling unit 3 or on the engine 2.

Failure of the drive train to disengage can also be detected, however, when the vehicle acceleration exceeds a predetermined maximum value. An embodiment according to the invention includes a wheel revolution sensor 15 to detect vehicle acceleration and provide corresponding signals to the evaluation unit 11.2 which acts on the control device 11.1 if the predetermined maximum figure is exceeded.

In a device of this type, acceleration sensors mounted on the vehicle body are also conceivable. Such sensors, for example, can supply reproducible acceleration signals through the utilization of the piezoelectrical effect or through the use of electromagnetic waves.

To detect an erroneous control indication, the control device 11.1 verifies the signals supplied by the sensors 19 and 20 which are coordinated with the engine speed increase device 13 for plausibility. For example, for an engine speed increase device constructed as a no-load fuel charge adjustment control valve (not illustrated in the drawing), the position sensor 13 monitors the control valve position, while the function sensor 19 monitors the quantity of air flowing through an intake pipe leading to the valve. If the position sensor 20 and the function sensor 19 send contradictory signals to the control device 11.1, the control device inhibits activation of the engine speed increase device 13 and/or takes other steps described hereinafter to prevent acceleration of the vehicle.

If an erroneous control signal initiates undesired vehicle acceleration in the drive train, various devices can be automatically actuated to counteract the acceleration. For example, the control device 11.1 can disconnect the drive train by causing disengagement of the coupling unit 3, or by disconnecting drive elements in the transmission by means of the transmission actuation device 14. Moreover, vehicle acceleration which is caused by erroneous control can also be inhibited by blocking the operation of the drive train. In this case, the control device 11.1 initiates operation of the engine brake device 12 and/or the vehicle wheel brake devices 10.1–10.4.

The typical embodiment of the invention shown in FIG. 1 includes a number of devices for preventing undesired vehicle acceleration according to the invention. It will be understood that the application of the principles on which those devices are based is not limited to the arrangements illustrated in the drawing. Nevertheless, it may be possible to provide adequate safety precautions with a smaller number of safety devices.

The flow diagram shown in FIG. 2 illustrates the steps carried out during the operation of the representative embodiment of the invention shown in FIG. 1. The control procedures provided according to this diagram are governed by the overall control embodied in the control device 11.1.

The control process diagram of FIG. 2 shows essentially a transmission train operation from Start to End, as well as a side train illustrated in the right hand part of the drawing. The principle behind the operation of the transmission train is that, in an ordinary vehicle 1 with properly functioning elements, the engine speed increase device 13 should always be operative when synchronization must be effectuated during automatic shifting to a lower gear or when the driver activates the accelerator 18, i.e. wishes to accelerate the vehicle 1. In addition, for vehicles having a system for automatic speed control, another possibility for acting on the engine speed increase device is possible. The start-up of the automatic speed control, like the activation of the accelerator 18, is however contingent upon a deliberate action of the driver. Accordingly, a vehicle acceleration occurs that is surprising to the driver, and hence not permissible, when the vehicle 1 accelerates in response to activation of the engine speed increase device 13 without operator activation of the accelerator or of the automatic speed control system.

Thus, the control process illustrated in FIG. 2 is activated within the overall control procedure if a downward shift to a lower gear is required. First, a check is made to see whether the accelerator 18 has been activated. If the accelerator 18 has been activated, the steps for carrying out the safety procedure according to the invention are abandoned, and there is a return to the overall control process. In vehicles with automatic speed control, the start-up of the automatic speed control is also abandoned, which is not illustrated in the diagram. If the automatic speed control has been started up, there will also be a return to the overall control process. If the accelerator (and, if relevant, the automatic speed control) is not activated, the engine speed increase device 13 is activated. The vehicle 1, which is in a push condition during down-shifting, exhibits a reverse action on the drive train, which can be eliminated by activation of the engine speed increase device so that disconnection of the drive train from the drive wheels is possible with little expenditure of energy.

The drive train then remains connected for a predetermined period of time (hereinafter called the holding time) before disengagement occurs. Thereafter, the process plan branches out into the lateral train shown in FIG. 2 if the drive train is not disconnected. In the case of proper disengagement, the engine speed increase device 13 is again activated until the engine speed necessary for synchronization is achieved. Disengagement of the drive train is continuously monitored in a return loop until synchronization is reached. After synchronization, the desired automated shifting process can be carried out. Thus, all of the control processes necessary for proper shifting are indicated in the direct line of the diagram.

In contrast to the foregoing, the measures for carrying out safety procedures according to the invention are indicated in the lateral branch of FIG. 2. This branch indicates the steps taken if it is determined that the drive train is not disconnected when the activation of the engine speed control device 13 is started. Following this step, it is first determined whether in fact there is no further increase in the engine speed. If, because of an erroneous control or a defective function element, the engine speed increases independently of the control, there is a disengagement and/or blocking of drive train, and the vehicle is stopped immediately following this disengagement. If, when the engine speed increase is verified, it is determined that in fact the engine speed increase device 13 is not being further activated, another effort is initiated to perform a shifting operation. A mark, indicated by "X" in the process plan, indicates the number of efforts to disconnect the drive train which may be carried out unsuccessfully before the vehicle is shut down.

Thus, with the control process plan, illustrated in FIG. 2, a safety procedure to prevent undesired acceleration can be carried out which begins precisely when, because of erroneous control during a speed increase necessary for synchronization, a driving connection exists between the engine 2 and the vehicle drive wheels 5 and 6; or when, because of erroneous control, the engine speed increase device 13 is activated when the engine 2 and the vehicle drive wheels 5 and 6 are connected.

Although the invention has been described herein with reference to specific embodiments, many modifications and variations therein will readily occur to those skilled in the art. Accordingly, all such variations and modifications are included within the intended scope of the invention.

I claim:

1. Apparatus for preventing undesired acceleration of a vehicle comprising a drive train including an engine, transmission means and vehicle drive wheel means, engine speed increase means for automatically increasing the engine speed, control means for the engine speed increase means, accelerator means for controlling the engine speed by an operator of the vehicle, and means responsive to the control means for preventing transmission of driving power to the drive wheel means if the drive train is not disengaged within a predetermined period of time after actuation of the engine speed increase means and the accelerator means is not requiring increased engine speed, including sensor means for detecting disengagement of the drive train and supplying corresponding signals to the control means.

2. Apparatus according to claim 1, wherein the sensor means includes a plurality of transmission sensors for detecting the position of components in the transmission means.

3. Apparatus according to claim 1 including vehicle engine speed sensor means and evaluation means responsive to signals from the engine speed sensor means for supplying signals to the control means when the engine speed acceleration resulting from operation of the engine speed increase means is greater than the maximum engine speed acceleration achievable during vehicle acceleration.

4. Apparatus according to claim 1, including vehicle speed sensor means and evaluation means responsive to the vehicle speed sensor means for supplying signals to the control means when the vehicle acceleration does not exceed a predetermined maximum value.

5. Apparatus according to claim 1, including sensor means for detecting undesired actuation of the engine speed increase means and supplying signals to the control means.

6. Apparatus according to claim 1, wherein the sensor means include at least one position sensor and at least one function sensor and wherein contradictory signals from the position and function sensors cause at least one of the engine speed increase means and the drive train to be disabled.

7. Apparatus according to claim 1, including disengaging means for independently disengaging the drive train.

8. Apparatus according to claim 7, wherein the disengaging means is responsive to a transmission activation device to disengage transmission elements in the transmission means.

9. Apparatus according to claim 7, including coupling means operatively positioned between the engine and the transmission means for disengaging the drive train.

10. Apparatus according to claim 1, including drive train blocking means for blocking the operation of the drive train.

11. Apparatus according to claim 10, wherein the drive train blocking means comprise engine braking means.

12. Apparatus according to claim 10, wherein the drive train blocking means comprises wheel braking means.

13. A method for preventing undesired acceleration of a vehicle having a drive train that can be automatically disabled including an engine, a transmission and vehicle drive wheels, and having an engine speed increase device for automatically increasing the engine speed, a control device for the engine speed increase device, and an accelerator for control of engine speed by the vehicle operator comprising automatically preventing transmission of driving power to the drive wheels if the drive train is not disengaged within a predetermined period of time after actuation of the engine speed increase device and the accelerator is not operated to require increased engine speed.

14. A method according to claim 13 including the step of automatically disabling the drive train in response to erroneous engine speed increase signals.

* * * * *

UNITED STATES PATENT AND TRADEMARK OFFICE
CERTIFICATE OF CORRECTION

PATENT NO. : 4,962,835

DATED : October 16, 1990

INVENTOR(S) : Ludwig Pruss

It is certified that error appears in the above-identified patent and that said Letters Patent is hereby corrected as shown below:

Column 1, line 56, "independent" should read --automatic--;

Column 6, line 65, "claim 1" should read --claim 5--.

Signed and Sealed this

Ninth Day of June, 1992

Attest:

DOUGLAS B. COMER

Attesting Officer

Acting Commissioner of Patents and Trademarks